J. G. SHURTZ.
BAG HOLDER AND FILLER.

No. 193,351. Patented July 24, 1877.

WITNESSES:
J. C. Wilckie
N. H. Sherburne

INVENTOR:
John G. Shurtz
By Gridley Sherburne
and J. F. Hatch, Attorneys

UNITED STATES PATENT OFFICE.

JOHN G. SHURTZ, OF CHICAGO, ILLINOIS, ASSIGNOR OF TWO-THIRDS HIS RIGHT TO PETER C. HUFFMAN AND JOHN P. DICKEY, OF SAME PLACE.

IMPROVEMENT IN BAG HOLDERS AND FILLERS.

Specification forming part of Letters Patent No. 193,351, dated July 24, 1877; application filed June 22, 1877.

*To all whom it may concern:*

Be it known that I, JOHN G. SHURTZ, of Chicago, in the county of Cook and State of Illinois, have invented certain new and useful Improvements in Bag-Holders; and I do hereby declare the following to be a full, clear, and exact description thereof, which will enable others skilled in the art to which my invention appertains to make and use the same, reference being had to the accompanying drawings, forming part of this specification, in which—

Figure 1:
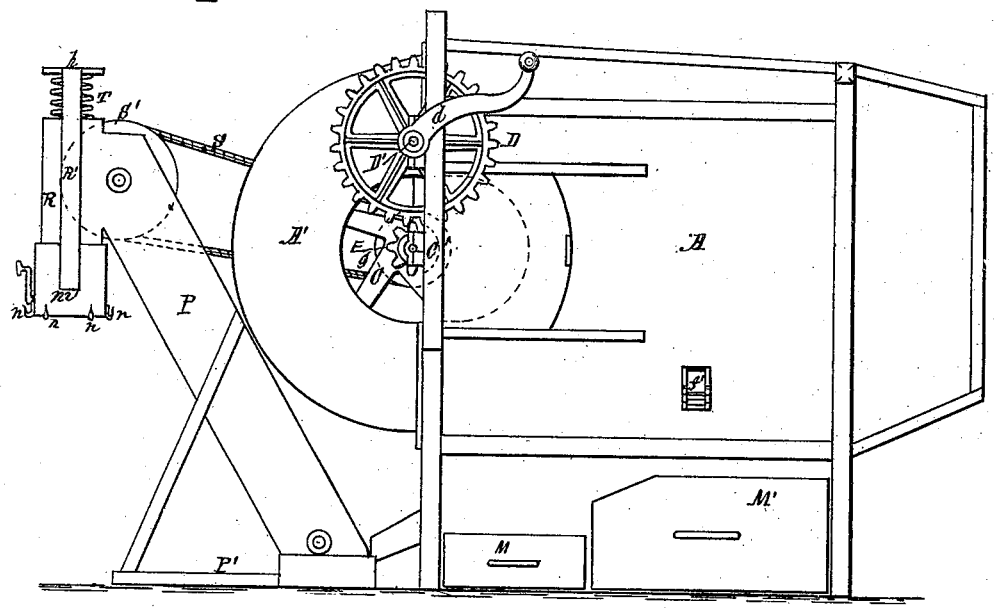
Figure 2:
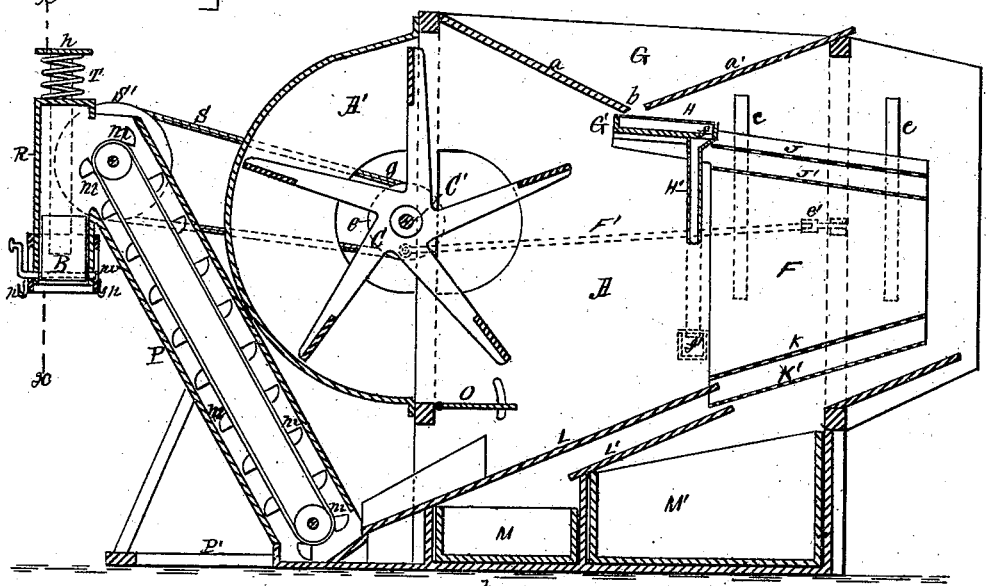
Figure 3:
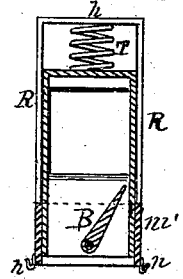

Figure 1 represents a side elevation of a grain and seed separator embodying said invention. Fig. 2 represents a longitudinal sectional elevation of the same. Fig. 3 represents a vertical transverse section of the elevator, taken on the line $x\,x$, drawn through Fig. 2.

Like letters of reference indicate like parts.

My invention relates to an improved means by which the cleaned grain may be deposited in suitable sacks as it is discharged from the separator.

To that end my invention consists in the arrangement of the several parts, as will be more fully set forth by the following description and claim.

In the drawing, A represents the frame of a fanning-mill, which will not be more particularly described.

L′ is a conveyer or apron, which is arranged below and in a plane parallel with the grain-board L, and extending from a point immediately under the front edge of the screen K′ to a point near the center of the grain-board, as shown in Fig. 2.

M and M′ are the chess-boxes, which are arranged within the lower portion of the machine, immediately under the grain-board and conveyer, and into which the finer grain and seeds are deposited.

O is a wind-board, which is hinged to the lower wall of the fan-case, and is so arranged as to admit of being raised or lowered to change its inclination, the object of which is to change the direction of the current of air escaping from the fan-case.

P is an ordinary elevator, which is screwed upon a movable platform, P′, and so arranged as to admit of being adjusted to the machine and in proper position to allow the cleaned grain passing over and from the grain-board L to be discharged from the said board into the buckets $m$ of the elevator.

S is an ordinary belt, which passes over and around a wheel, $g$, on the outer end of the fan-shaft C′ and the elevator-shaft, by which means motion is communicated to the elevator-buckets by the rotation of the fan-shaft.

R is the discharge-throat of the elevator, into and through which the cleaned grain is discharged.

R′ is a movable frame, which is secured to the outer surface of the throat R by means of guide-sleeves at each side thereof, and is provided at its lower end with a band, $m'$, which encircles the lower end of the throat, and is so arranged as to admit of a free and easy ascending and descending movement.

T is a coiled spring, which is interposed between the upper wall or top of the throat and the cross-bar $h$ of the frame, so as to hold the frame at the limit of its upward movement.

The band $m'$ is provided at its lower edge with a series of hooks, $n$, upon which the sack into which the grain is to be deposited is suspended.

The object of making the frame R′ adjustable vertically is to allow the same to be moved downward, for the purpose of disengaging the hooks from the sack when the latter is filled with grain.

B is a gate or valve, which is journaled centrally within the throat at the lower extremity thereof, and is so arranged as to admit of a rocking movement. The width of this gate is slightly greater than one-half width of the throat, so that when it is turned in either direction its upper edge will rest against the wall of the throat, as shown in Fig. 3, and so as to convey the grain being discharged to the opposite side of the throat.

The object of this gate is to convey the grain to one side of the throat, so that an empty sack may be attached on the opposite side of the throat before the one being filled is removed, and thereby prevent the grain from being discharged upon the floor, which is prevented by turning the gate so as to discharge the grain into the empty sack before the one which is filled is removed.

I claim—

The combination, with the throat R of the elevator P, of the adjustable frame R', sliding in vertical guides upon said throat, pressure-spring T, supported upon the top of said throat, and band $m'$, substantially as and for the purpose specified.

JOHN G. SHURTZ.

Witnesses:
F. A. HERRING,
J. F. HATCH.